United States Patent [19]

Takeuchi

[11] Patent Number: 4,898,339
[45] Date of Patent: Feb. 6, 1990

[54] BAIL REVERSING STRUCTURE FOR FISHING SPINNING REELS

[75] Inventor: Shinji Takeuchi, Tokyo, Japan

[73] Assignee: Daiwa Seiko, Inc., Tokyo, Japan

[21] Appl. No.: 221,412

[22] Filed: Jul. 19, 1988

[30] Foreign Application Priority Data

Aug. 20, 1987 [JP] Japan .................. 62-126661

[51] Int. Cl.⁴ .............. A01K 89/01; A01K 89/04
[52] U.S. Cl. ................................ 242/231; 242/233
[58] Field of Search ............... 242/84.2 A, 84.2 F, 242/84.2 G, 84.2 R, 231, 232, 233

[56] References Cited

U.S. PATENT DOCUMENTS

| | | | |
|---|---|---|---|
| 3,342,442 | 9/1967 | Brantingson | 242/84.2 G |
| 4,427,161 | 1/1984 | Sakumoto | 242/84.2 A |
| 4,535,952 | 8/1985 | Carlsson | 242/84.2 G |
| 4,676,450 | 6/1987 | Carpenter et al. | 242/84.2 G |
| 4,705,228 | 11/1987 | Maruyama et al. | 242/84.2 G |
| 4,747,559 | 5/1988 | Hitomi | 242/84.2 G |

FOREIGN PATENT DOCUMENTS 59-47471  3/1984  Japan .................. 242/84.2 G
61-186361  11/1986  Japan .

Primary Examiner—Joseph J. Hail, III
Attorney, Agent, or Firm—Browdy and Neimark

[57] ABSTRACT

A bail reversing structure, in which a working portion of an operating lever is positioned on the rear side of a pivotably supported portion thereof with a contact surface of a locking projection of an arm lever formed arcuately facing a pivotably connected portion thereof, whereby a reversing stroke of the arm lever is increased with respect to a turning angle of the operating lever to minimize the projection of the operating lever, enable the fishing line to be held by a finger tip simultaneously with a bail reversing operation, and a fishing line releasing operation to be carried out smoothly and speedily, and prevent the seawater, sand and dirt on the fishing line from being deposited on the engaged portions of the operating lever and arm lever.

1 Claim, 3 Drawing Sheets

BAIL REVERSING STRUCTURE FOR FISHING SPINNING REELS

BACKGROUND OF THE INVENTION

1. Field of the Invention

This invention relates to an improvement in a bail reversing structure for fishing spinning reels.

2. Description of the Prior Art

There is a known means for a fishing spinning reel, used to reverse a bail in a fishing line winding position to a fishing line releasing position, in which an operating lever supported pivotably on a bail mounting arm is engaged with an arm lever supported pivotably on the bail mounting arm, and drawn to turn the bail back to the fishing line releasing position, which means is disclosed in Japanese Utility Model Laid-open No. 47471/1984. In order to hold the fishing line reliably by a finger tip simultaneously with the pivotal reversing of the bail, it is necessary that the arm lever be turned as quickly as possible to the fishing line releasing position. To meet this requirement, the angle at which the operating lever is drawn must be increased. Consequently, the free end portion of the operating lever projects excessively in the radial direction of a rotor, and the bulk of the spinning reel increases. This causes the dimensions of the spinning reel to be increased, and the balance of rotation of the rotor to be lost. This will hinder the fishing operation.

It is known from Japanese Utility Model Laid-open No. 186361/1986 that means for eliminating these inconveniences was developed in which a locking projection is provided on the portion of the outer surface of an arm lever which is on the front side of the pivotably connected portion thereof, with an operating lever, which has an operating surface engaged with this locking projection, joined pivotably to the side portion of a bail mounting arm which is on the front side of the position in which the arm lever is pivotably connected. In this system, the operating surface and locking projection are engaged with each other in a position on the front side of the outer side surface of the arm lever and in the vicinity of a line roller. Therefore, the seawater, sand and dirt deposited on the fishing line being wound or payed out during the fishing tend to be collected on the engaged portions of the arm lever and operating lever. This hampers the engaging operations of these levers, so that the reversing of the bail cannot be done smoothly and lightly.

SUMMARY OF THE INVENTION

Therefore, an object of the present invention is to provide a bail reversing structure, in which, in view of these inconveniences, a working portion of an operating lever is positioned on the rear side of a pivotably supported portion thereof, with a contact surface of a locking projection of an arm lever formed arcuately facing a pivotably connected portion thereof, whereby the reversing stroke of the arm lever is increased with respect to the turning angle of the operating lever to minimize the projection of the operating lever and enable the fishing line to be held by a finger tip simultaneously with a bail reversing operation, and a fishing line releasing operation to be carried out smoothly and reliably.

Another object of the present invention is to provide a bail reversing structure capable of amplifying the turning movement of the arm lever greatly with respect to that of the operating lever, and allowing the arm lever to be thereby turned back reliably to the fishing line releasing position without projecting the operating lever outward greatly in the radial direction of a rotor, the fishing line to be held easily with a bail reversing operation, and a fishing line releasing operation to be carried out speedily and smoothly.

Still another object of the present invention is to provide a bail reversing structure formed so that the working portion of the operating lever and the locking projection of the arm lever are engaged with each other on the rear side of the pivotably connected portion of the arm lever, whereby the seawater, sand and dirt, which are deposited on the fishing line, do not stick to the engaged portions of the operating lever and arm lever, so that the drawing of the operating lever can be done smoothly and lightly.

The above and other objects as well as advantageous features of the invention will become apparent from the following description of the preferred embodiments taken in conjunction with the accompanying drawings.

BRIEF DESCRIPTION OF THE DRAWINGS

The accompanying drawings show the embodiments of the present invention, wherein.

DESCRIPTION OF THE PREFERRED EMBODIMENTS

Figure 1:
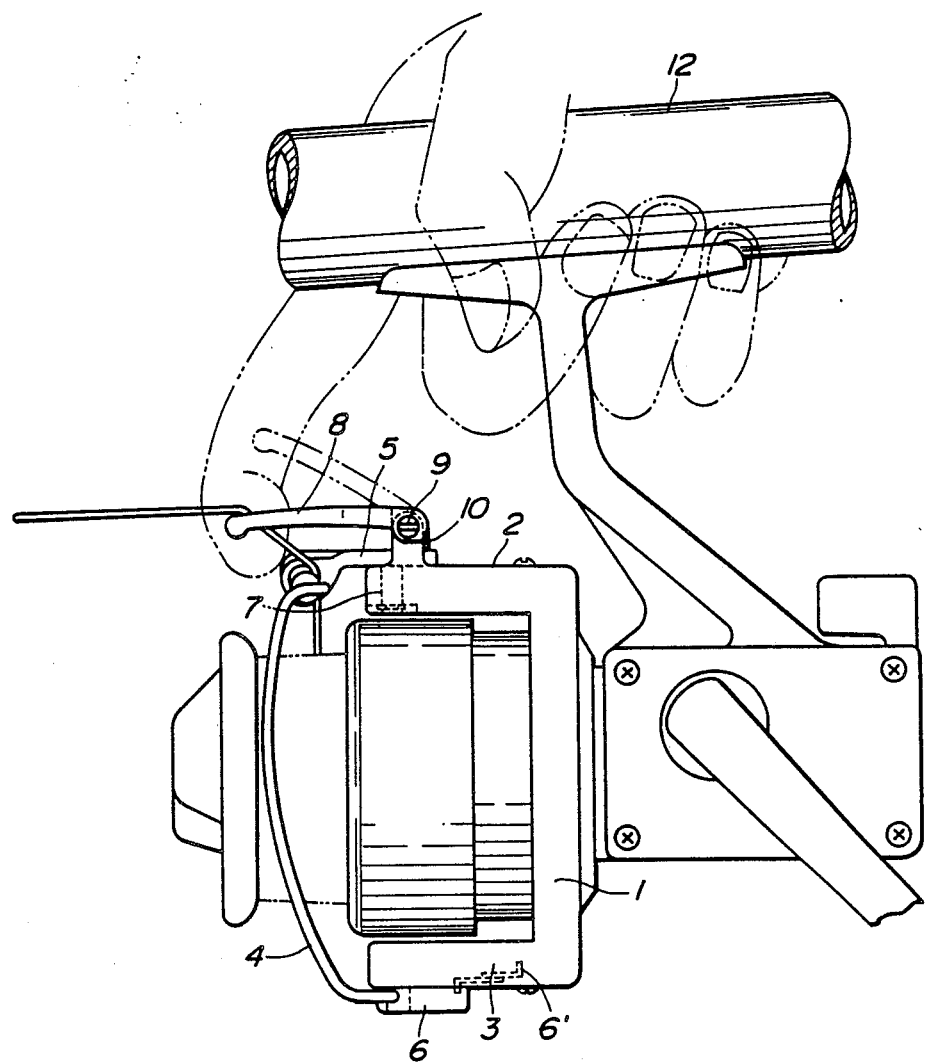
FIG. 1 is a front elevation.

The details of the present invention will now be described with reference to the drawings illustrating the embodiments thereof. An arm lever 5 having a line roller 5' and an arm holder 6, which are fixed to both end portions of a bail 4 in a known manner, are connected pivotably via a pin 7 to bail mounting arms 2, 3 provided at both sides of and integrally with a rotor 1 in a spinning reel, and the bail 4 is urged separately toward a fishing line winding position and a fishing line releasing position by a known spring member 6' provided in the arm holder 6. An operating lever 8 is supported via a shaft 9 on one side portion of a front end section of the bail mounting arm 2 so that the operating lever 8 can be drawn freely in the outward direction, i.e. radial direction of the rotor 1.

An operating projection 10 projects from the rear portion, which is on the side of the rotor, of the pivotably supported section of the operating lever 8, and a locking projection 11, with which the operating projection 10 is engaged, is provided on the rear side of the pivotably connected portion of the outer surface of the arm lever 5. Especially, the engaging surface of the locking projection 11 is formed arcuately substantially facing the pivotably connected portion of the arm lever 5.

Figure 3:
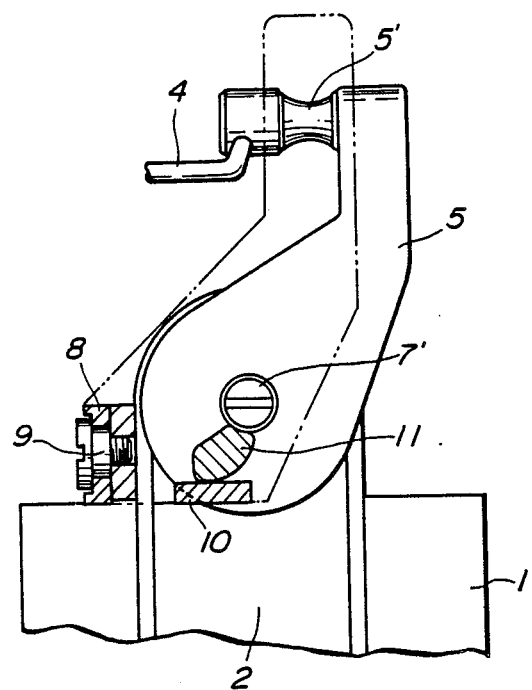
FIG. 3 is a partially cutaway plan of a principal portion of another embodiment of the present invention.
Figure 4:
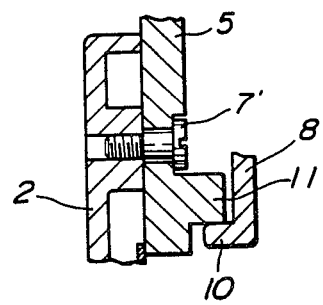
FIG. 4 is a sectional view of a principal portion of the embodiment of FIG. 3.

In this embodiment, the pin 7 is formed integrally with and projected from the arm lever 5 and fitted in the bail mounting arm 2. FIGS. 3 and 4 show an embodiment in which an arm lever 5 is fixed to a bail mounting arm 2 by an independent pin 7'.

Figure 2:
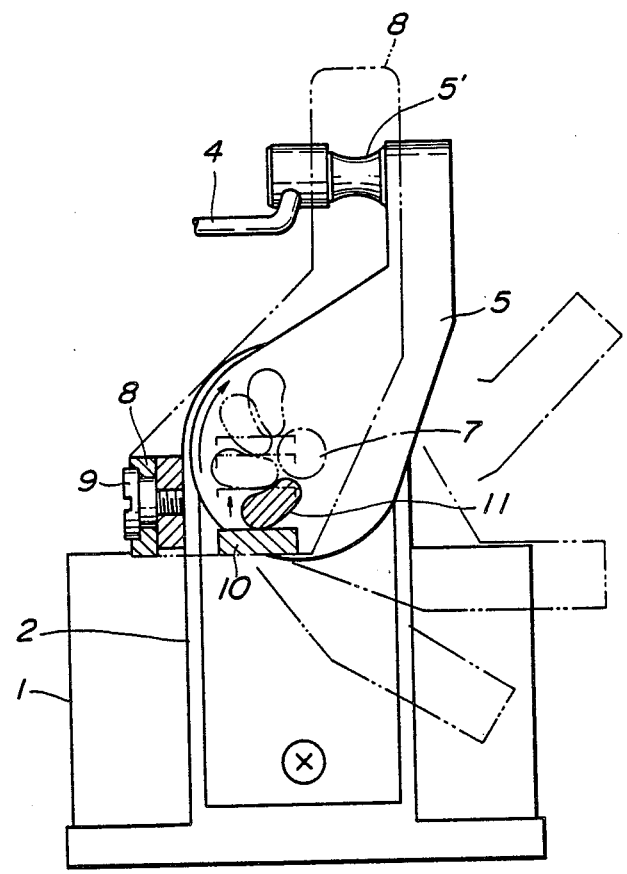
FIG. 2 is a partially cutaway plan of a principal portion of the present invention.

The present invention is formed as described above. Accordingly, when the operating lever 8 is drawn and turned upward, i.e., toward the fishing rod 12 by the forefinger of the hand by which the fishing rod 12 is gripped, the operating projection 10 engages the arcuate portion of the locking projection 11 to turn the arm lever 5 and cause the bail 4 to be reversed to the fishing line releasing position. During this time, the engaged portion of the operating projection 10 with respect to the locking projection 11 is shifted from the outer side of the arcuate portion to the central portion as shown by chain lines in FIG. 2 as the arm lever 5 is turned, so that the arm lever 5 can be turned largely with a small stroke of the operating projection 10. Moreover, since the operating projection 10 of the operating lever 8 and the engageable portion of the arcuate locking projection 11 are far away from the line roller 5', the seawater, sand and dirt deposited on the fishing line guided by the line roller 5' are not deposited on the engaged portions of these levers 8, 10. This enables a bail reversing operation to be carried out smoothly and lightly for a long period of time.

The present invention is not, of course, limited to the above embodiments; it may be modified in various ways within the scope of the appended claim.

What is claimed is:

1. A bail reversing structure for fishing spinning reels for moving a bail between a fishing line winding position and a fishing line releasing position, comprising:

an arm lever having a portion pivotally connected to a first end portion of the bail, said arm lever comprising a line roller, said arm lever having a substantially planar first surface and a second surface, said first surface being disposed further radially outwardly with respect to a rotor than said second surface;

an arm holder provided on a second end portion of the bail, said arm lever and said arm holder being mounted pivotally on bail mounting arms provided on both sides of the rotor;

an operating lever having a portion pivotally supported on a pivot axis on the bail mounting arm to which said arm lever is pivotally connected in such a manner that said operating lever can be drawn freely in a radial direction with respect to the rotor, the bail being moved between the fishing line winding position and the fishing line releasing position by turning said operating lever;

a locking projection formed on said first surface of said arm lever radially inwardly of said operating lever with respect to the rotor and extending radially outwardly from said first surface;

an arcuate engaging portion formed on a radially extending surface of said locking projection which substantially faces said pivotally connected portion of said arm lever; and an operating projection provided on a rear side of a pivotally supported portion of said operating lever relative to the bail mounting arm, on the side of the operating lever nearest the rotor for directly engaging said engaging portion of said locking projection and extending radially inwardly of said operating lever with respect to the rotor, wherein said pivotally supported portion of said operating lever and said operating projection, in an unactuated state, are disposed on a rear side of said pivotally supported portion of said arm lever.

* * * * *